United States Patent [19]
Jenko et al.

[11] Patent Number: 5,152,253
[45] Date of Patent: Oct. 6, 1992

[54] VESSEL STRUCTURAL SUPPORT SYSTEM

[75] Inventors: James X. Jenko, N. Versailles; Howard L. Ott, Kiski Twp., Allegheny County; Robert M. Wilson, Plum Boro; Robert M. Wepfer, Murrysville, all of Pa.

[73] Assignee: Westinghouse Electric Corp., Pittsburgh, Pa.

[21] Appl. No.: 647,629

[22] Filed: Jan. 28, 1991

[51] Int. Cl.⁵ .............................................. F22B 37/24
[52] U.S. Cl. ................................. 122/510; 248/146; 376/285
[58] Field of Search ................... 122/510; 248/146; 376/285

[56] References Cited
U.S. PATENT DOCUMENTS

| | | |
|---|---|---|
| 3,129,836 | 4/1964 | Frevel . |
| 3,130,130 | 4/1964 | Haines et al. . |
| 3,771,499 | 11/1973 | Marroni, Jr. . |
| 3,916,944 | 11/1975 | Crawford et al. . |
| 3,947,322 | 3/1976 | Dorner et al. . |
| 3,951,108 | 4/1976 | Rees ...................................... 122/510 |
| 4,008,757 | 2/1977 | Weatherford, Jr. . |
| 4,115,194 | 9/1978 | Butti . |
| 4,511,532 | 4/1985 | Pièrart . |
| 4,645,638 | 2/1987 | Burelbach et al. . |
| 4,688,628 | 8/1987 | Moldenhauer . |
| 4,940,025 | 7/1990 | Ott et al. ............................. 122/510 |

Primary Examiner—Henry C. Yuen
Attorney, Agent, or Firm—Walter S. Stevens

[57] ABSTRACT

Vessel structural support system for laterally and vertically supporting a vessel, such as a nuclear steam generator having an exterior bottom surface and a side surface thereon. The system includes a bracket connected to the bottom surface. A support column is pivotally connected to the bracket for vertically supporting the steam generator. The system also includes a base pad assembly connected pivotally to the support column for supporting the support column and the steam generator. The base pad assembly, which is capable of being brought to a level position by turning leveling nuts, is anchored to a floor. The system further includes a male key member attached to the side surface of the steam generator and a female stop member attached to an adjacent wall. The male key member and the female stop member coact to laterally support the steam generator. Moreover, the system includes a snubber assembly connected to the side surface of the steam generator and also attached to the adjacent wall for dampening lateral movement of the steam generator. In addition, the system includes a restraining member of "flat" attached to the side surface of the steam generator and a bumper attached to the adjacent wall. The flat and the bumper coact to further laterally support the steam generator.

21 Claims, 10 Drawing Sheets

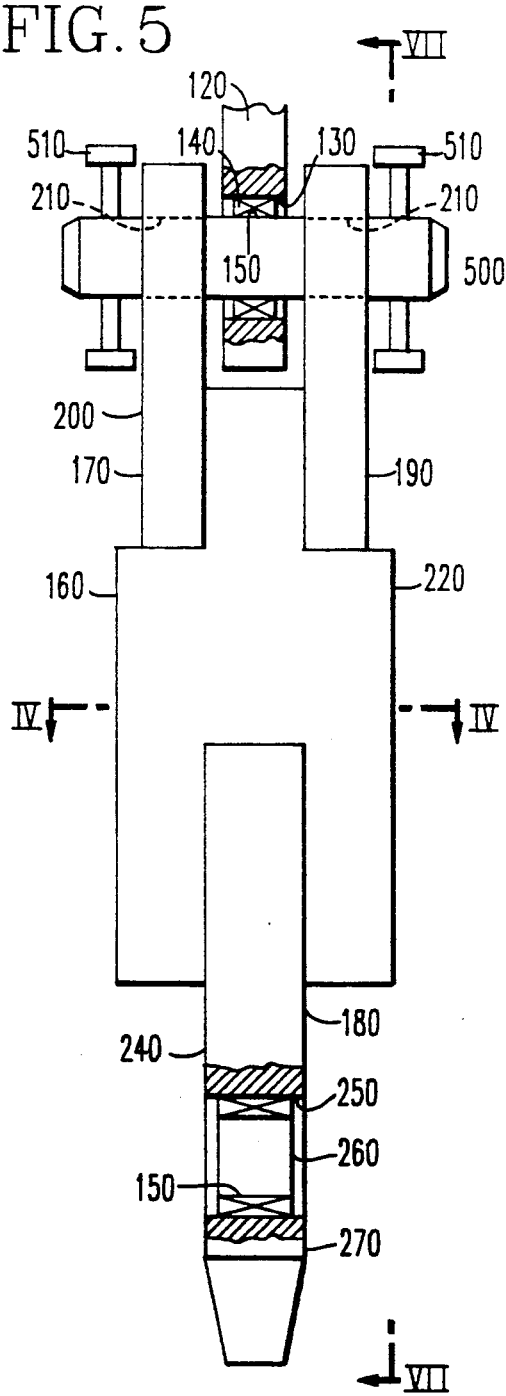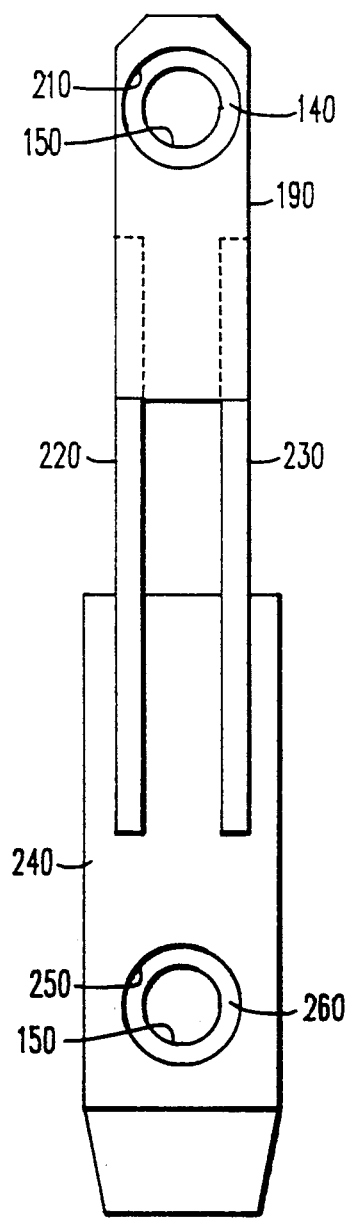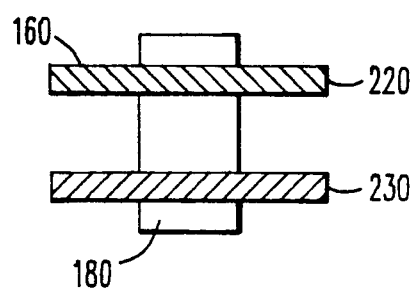

VESSEL STRUCTURAL SUPPORT SYSTEM

This invention was made in the course of work performed under Contract No. DE-AC03-86SF10638 between Westinghouse Electric Corporation and the U.S. Department of Energy. The Government may have rights in this application and any resulting patent.

BACKGROUND

This invention generally relates to structural support apparatus for vessels and more particularly relates to a lateral and vertical support system for a nuclear steam generator.

Vessel support devices are known. In a prior art design for a nuclear steam generator and pumps associated therewith, the steam generator and pumps are separate vessels each having their own multiple support systems. Thus, in this prior art design, four columns support the steam generator and three columns support each pump. In a more advanced design (e.g., the 600 Megawatt Advanced Power Water Reactor available from the Westinghouse Electric Corporation located in Pittsburgh, Pa.) the pumps are connected to and mounted underneath the steam generator rather than separate from the steam generator, thereby eliminating the need to have separate supports for the pumps. However, in this advanced design, the four columns that still support the steam generator obstruct and limit access to the pumps. Moreover, overturning moments are induced by seismic loads in the supports of this four-column support design.

An alternative means for supporting a vessel (e.g., a nuclear reactor vessel) within a nuclear power plant is disclosed in U.S. Pat. No. 3,916,944 issued Nov. 4, 1975 to James D. Crawford et al. and entitled "Reactor Vessel Supported By Flexure Member". This patent discloses a device comprising a plurality of vertical columns connected between a pressure vessel and a support base at the bottom of a containment well. According to this patent, the columns are designed to be flexible in a direction radial with respect to the vessel axis. However, this patent does not appear to disclose means for vertically supporting a vessel in combination with lateral support means for laterally supporting the vessel and means for limiting lateral movement of the vessel.

A support system for a J-shaped steam generator for use with a liquid metal-cooled nuclear reactor is disclosed in U.S. Pat. No. 4,688,628 issued Aug. 25, 1987 to James E. Moldenhauer and entitled "Steam Generator Support System". This patent discloses a device comprising a lower support assembly located directly underneath a steam generator assembly to provide vertical support. This patent also discloses horizontal support assemblies located adjacent an upper portion and lower portion of the steam generator assembly to provide support in the "X direction." However, this patent does not appear to disclose means for vertically supporting a vessel in combination with lateral support means for laterally supporting the vessel and means for limiting lateral movement of the vessel.

Therefore, a problem in the art has been to provide means for vertically supporting a vessel in combination with lateral support means for laterally supporting the vessel and means for limiting lateral movement of the vessel.

Another problem in the art has been to reduce the number of support columns to provide improved access to structures that may be adjacent to the vessel.

Yet another problem in the art has been to substantially reduce or eliminate the overturning moments that may act on vessel vertical supports.

SUMMARY OF THE INVENTION

Disclosed herein is a system for laterally and vertically supporting a vessel, such as a nuclear steam generator having a lower portion having an exterior bottom surface thereon and having an upper portion having an exterior side surface thereon. The system includes a bracket connected to the bottom surface. A support column is pivotally connected to the bracket for vertically supporting the steam generator. The system also includes a base pad assembly connected pivotally to the support column for supporting the support column and the steam generator. The base pad assembly, which is capable of being brought to a level position with respect to a floor by turning leveling nuts connected to the base pad assembly, is anchored to the floor. The system further includes an upper support assembly comprising a male key attached to the side surface of the upper portion of the steam generator and a complementary female stop member attached to an adjacent wall. The male key member and the female stop member coact to laterally support the steam generator. Moreover, the system includes a snubber assembly connected to the side surface of the steam generator and also attached to the adjacent wall for dampening or limiting lateral movement of the steam generator.

In addition, the system includes a lower support assembly comprising a restraining member or "flat" attached to the side surface of the lower portion of the steam generator and a bumper member aligned with the flat and attached to the adjacent wall. The flat and the bumper member coact to further laterally support the steam generator.

An object of the present invention is to provide a structural support system comprising means for vertically supporting a vessel in combination with lateral support means for laterally supporting the vessel and means for limiting lateral movement of the vessel.

A feature of the invention is the provision of a single support column pivotally connected at one end thereof to a vessel to be vertically supported and pivotally connected at the other end thereof to a base pad assembly, wherein the support column is not subject to overturning moments.

Another feature of the invention is the provision of a base pad assembly pivotally connected to one end of the support column, wherein the base pad assembly is capable of being adjusted or brought to a level position (i.e., perpendicular to the normal vertical axis of the vessel) with respect to a floor in which the base pad assembly is anchored.

An advantage of the invention is that the single support column allows improved access to structures adjacent the vessel.

DETAILED DESCRIPTION OF THE DRAWINGS

While the specification concludes with claims particularly pointing out and distinctly claiming the subject matter of the invention, it is believed the invention will be better understood from the following description, taken in conjunction with the accompanying drawings wherein:

FIG. 5 is a view in partial vertical section of the support column connected to the bracket;

FIG. 6 is a view in horizontal section of the support column taken along section line VI—VI of FIG. 5;

FIG. 7 is another view of the support column taken along section VII—VII of FIG. 5;

Figure 1:
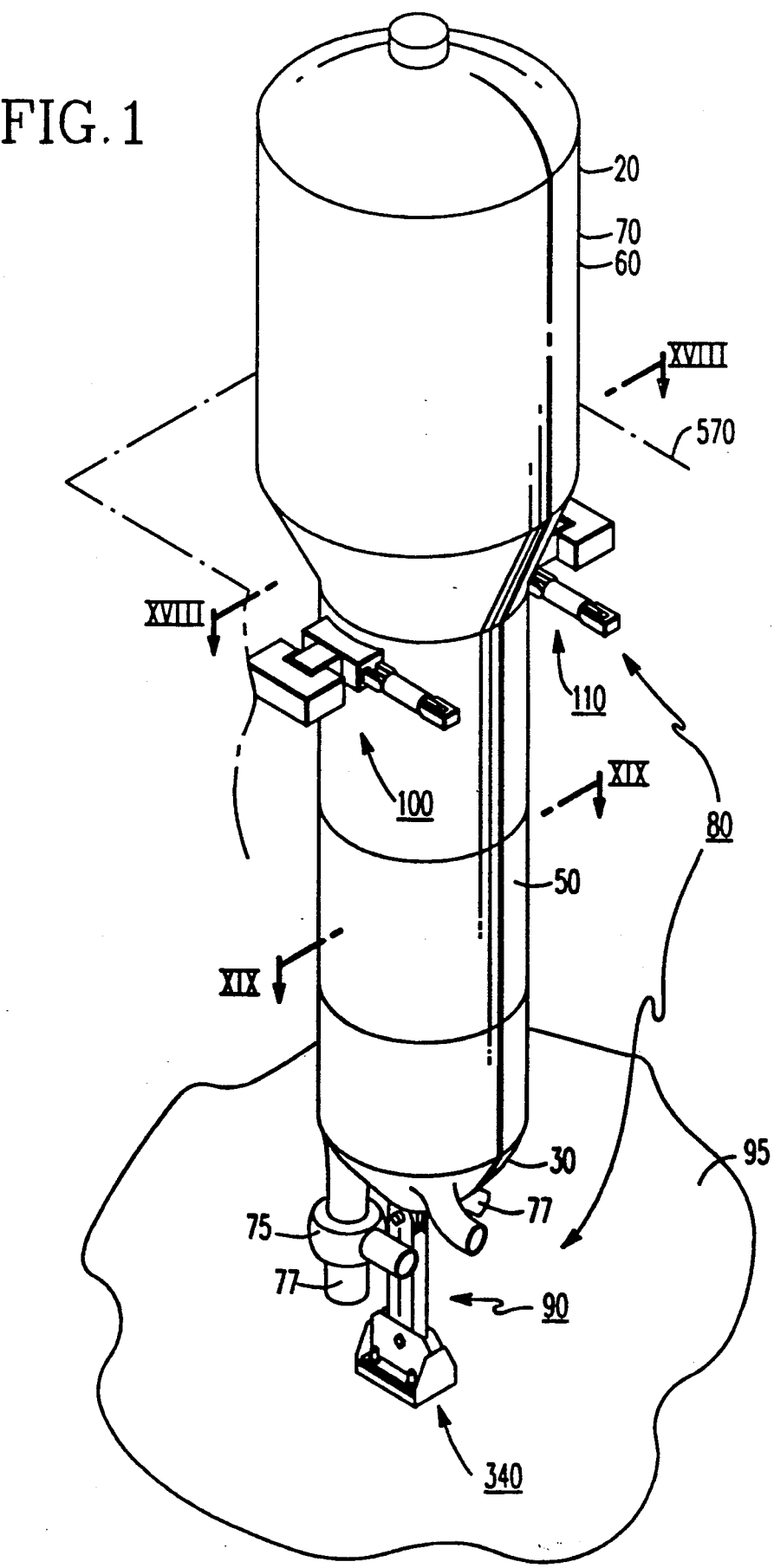
FIG. 1 is a perspective view of a nuclear steam generator and a vessel structural support system connected thereto.
Figure 18:
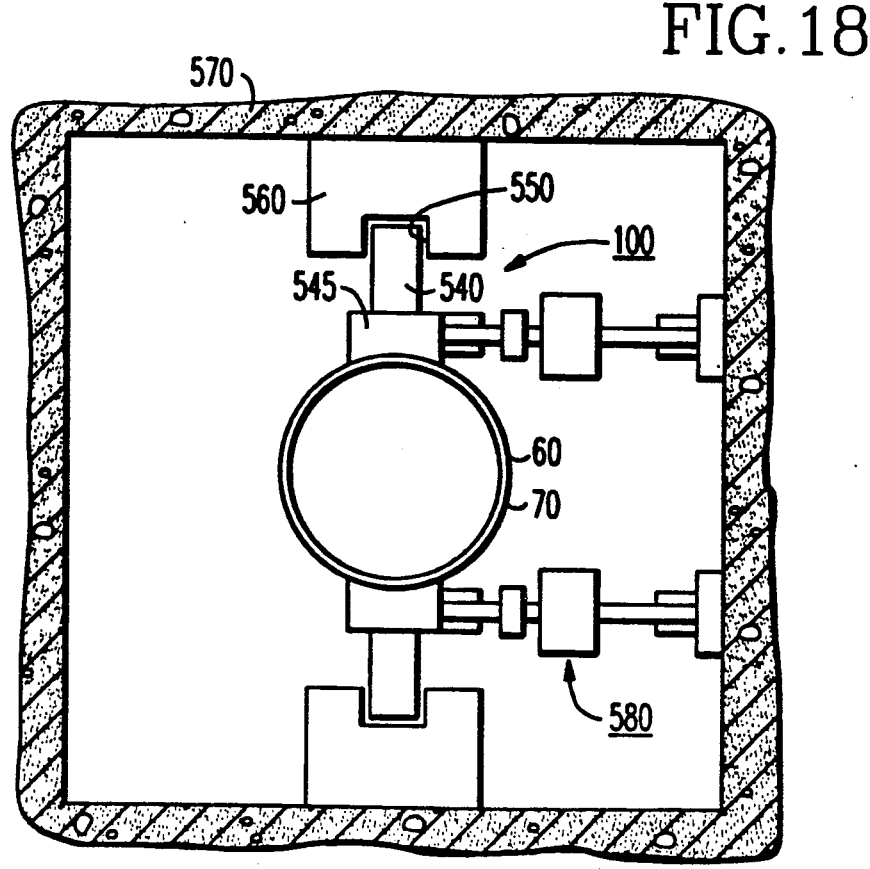
Figure 19:
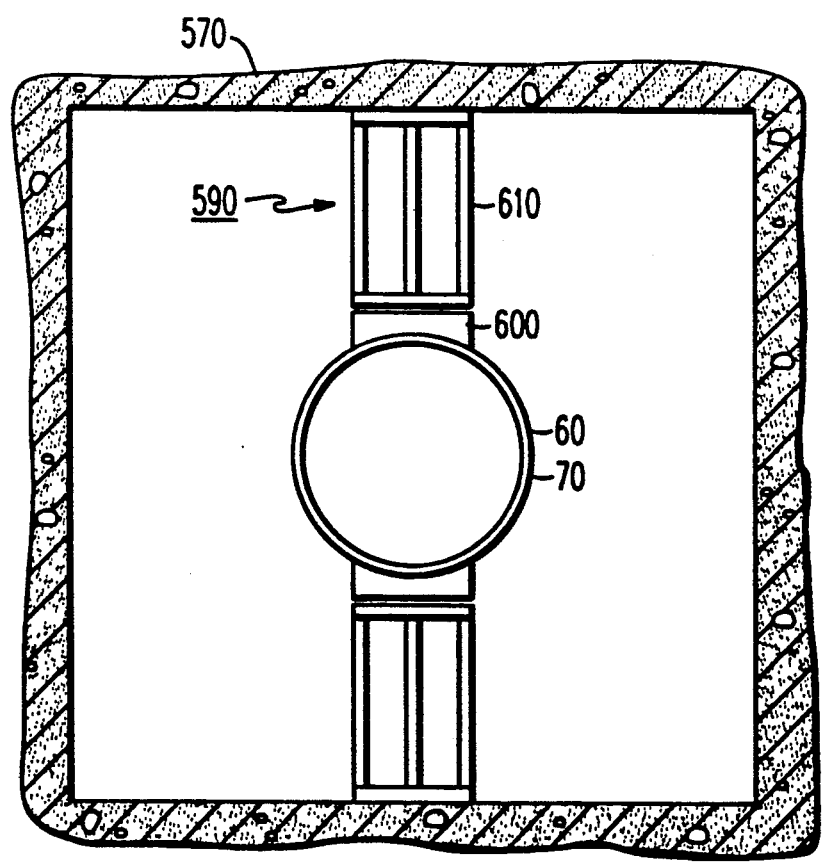

FIG. 18 is a view along section line XVIII—XVIII of FIG. 1 illustrating upper support means for laterally supporting the steam generator and illustrating snubber assemblies for limiting lateral movement of the steam generator, which steam generator is shown with parts removed for clarity; and FIG. 19 is a view along section line XIX—XIX of FIG. 1 illustrating lower support means for further laterally supporting the steam generator.

DETAILED DESCRIPTION OF THE PREFERRED EMBODIMENT(S)

Figure 2:
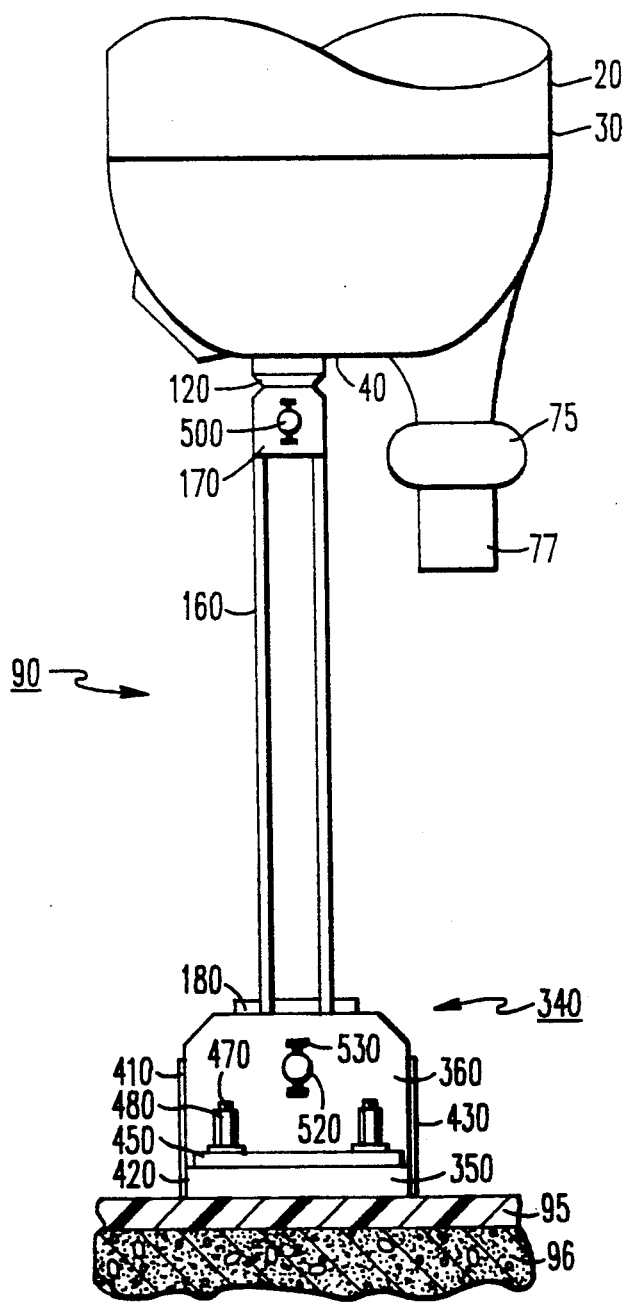
FIG. 2 illustrates a support column pivotally connected to the steam generator and a base pad assembly pivotally connected to the support column.
Figure 3:
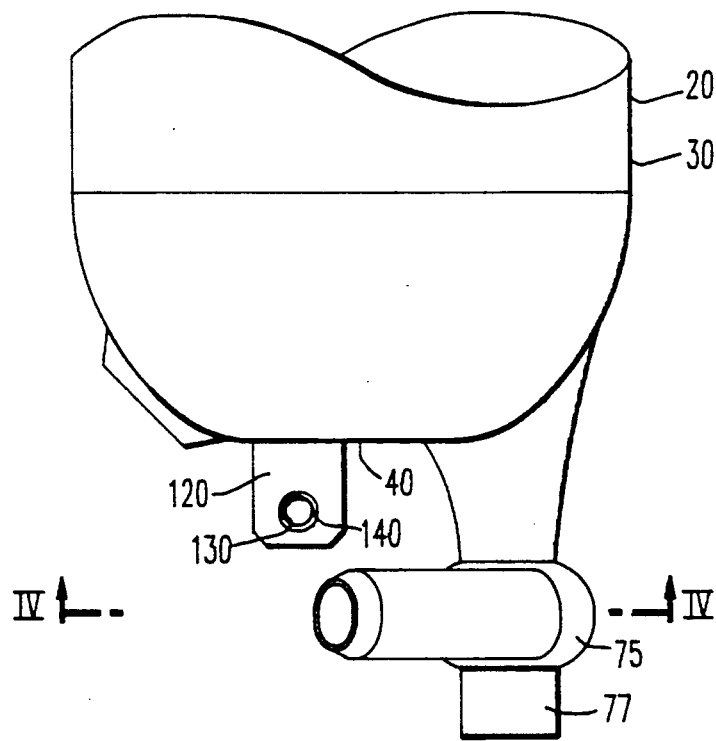
FIG. 3 illustrates a bracket connected to and depending from the bottom surface of the steam generator for connecting the support column to the steam generator.

Referring to FIGS. 1 and 2, there is shown a vertically-oriented vessel or nuclear steam generator 20 for producing steam. Steam generator 20 has a generally bowl-shaped lower portion 30 that has a generally horizontal exterior bottom surface 40 thereon. Steam generator 20, which is in fluid communication with a heat source (not shown) such as a nuclear reactor core, also includes a generally cylindrical intermediate portion 50 integrally attached to lower portion 30. Moreover, steam generator 20 has a generally cylindrical upper portion 60 integrally attached to intermediate portion 50. Intermediate portion 50 and upper portion 60 have a vertical exterior side surface 70. Attached to lower portion 30 of steam generator 20 are a plurality of pumps 75 which are also attached to primary loop piping 77 for pumping fluid (e.g., water) through piping 77 and steam generator 20 such that steam generator 20 produces steam in a manner well known in the art. A nuclear steam generator suitable for use with the present invention may be of the type associated with the 600 Megawatt Advanced Power Water Reactor which is available from the Westinghouse Electric Corporation located in Pittsburgh, Pa.

Still referring to FIGS. 1 and 2, there is shown the subject matter of the present invention, which is a vessel structural support system, generally referred to as 80, connected to steam generator 20 for supporting steam generator 20. Support system 80 generally comprises means 90 connected to bottom surface 40 for vertically supporting steam generator 20, upper support means 100 connected to and disposed adjacent to side surface 70 for laterally supporting steam generator 20, means 110 attached to upper support means 100 for limiting lateral movement of steam generator 20, and lower support means 590 connected to and disposed adjacent to side surface 70 for further laterally supporting steam generator 20. As disclosed more fully hereinbelow, vertical support means 90 is anchored in a floor 95 located beneath steam generator 20, which floor 95 may rest on a foundation 96 disposed therebeneath.

Figure 4:
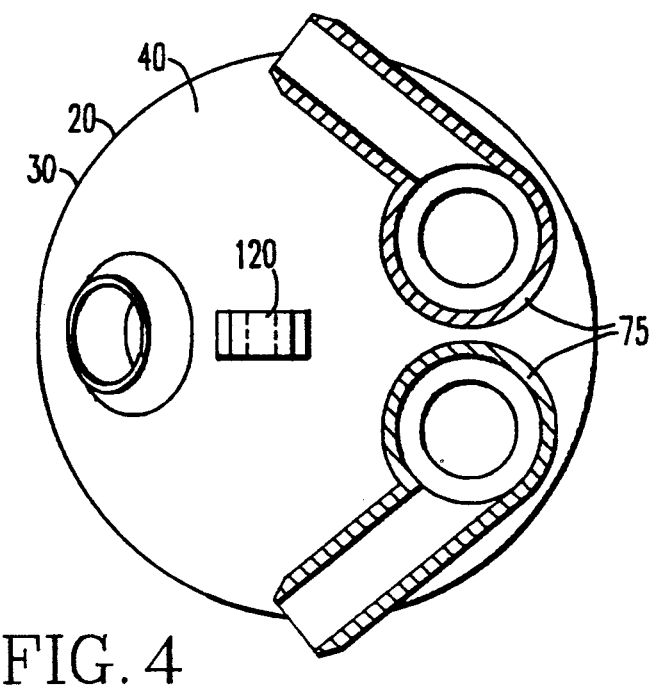
FIG. 4 illustrates the bracket and steam generator taken along section line IV—IV of FIG. 3.

Referring now to FIGS. 2, 3, 4, 5, 6, and 7, vertical support means 90 comprises a bracket 120 integrally attached to and depending from bottom surface 40. Bracket 120 may be attached to bottom surface 40 by welding. As best seen in FIG. 4, bracket 120 is disposed in an off-center position, with respect to the longitudinal vertical axis extending through steam generator 20, for limiting bending stresses in bracket 120. Bracket 120 has a circular hole 130 therethrough for reasons disclosed hereinbelow. Matingly disposed in hole 130 is a generally spherical first bearing 140 having a passage 150 therethrough. As described in more detail hereinbelow, a vertical support member or support column 160 is pivotally connected to bracket 120 for vertically pivotally supporting steam generator 20. Support column 160 has a crosssectional configuration sized to suitably bear anticipated vertical loads. Support column 160 has a distal end portion 170 and a proximal end portion 180. It will be appreciated that, as referred to herein, the term "proximal end portion" is defined as that portion nearer to floor 95 and the term "distal end portion" is defined as that portion farther away from floor 95.

As illustrated in FIGS. 2, 3, 4, 5, 6 and 7, the distal end portion 170 of support column 160 includes a first plate member 190 and a second plate member 200. Second plate member 200 is spaced-apart from and disposed parallel to first plate member 190. First plate member 190 and second plate member 200 each has a transverse circular first bore 210 therethrough capable of being coaxially and co-linearly aligned with passage 150 of bearing 140. Attached to the proximal ends of first plate member 190 and second plate member 200 and disposed perpendicular thereto is an elongated generally rectangular third plate member 220. Also attached to the proximal ends of first plate member 190 and second plate member 200 and disposed perpendicular thereto is an elongated generally rectangular fourth plate member 230. Third plate member 220 and fourth plate member 230 depend from the proximal ends of first plate member 190 and second plate member 200. It thus will be understood that fourth plate member 230 is disposed parallel to third plate member 220. Moreover, a fifth plate member 240 is attached to the proximal ends of third plate member 220 and fourth plate member 230 and disposed perpendicular thereto. Fifth plate member 240 depends from the proximal ends of third plate member 220 and fourth plate member 230 and has a transverse circular second bore 250 therethrough. For reasons provided more fully hereinbelow, second bore 250 has a generally spherical second bearing 260 matingly disposed therein. Second bearing 260 has passage 150 therethrough. Fifth plate member 240, which defines proximal end portion 180 of support column 160, has a tapered end portion 265 for reasons disclosed hereinbelow.

Figure 8:
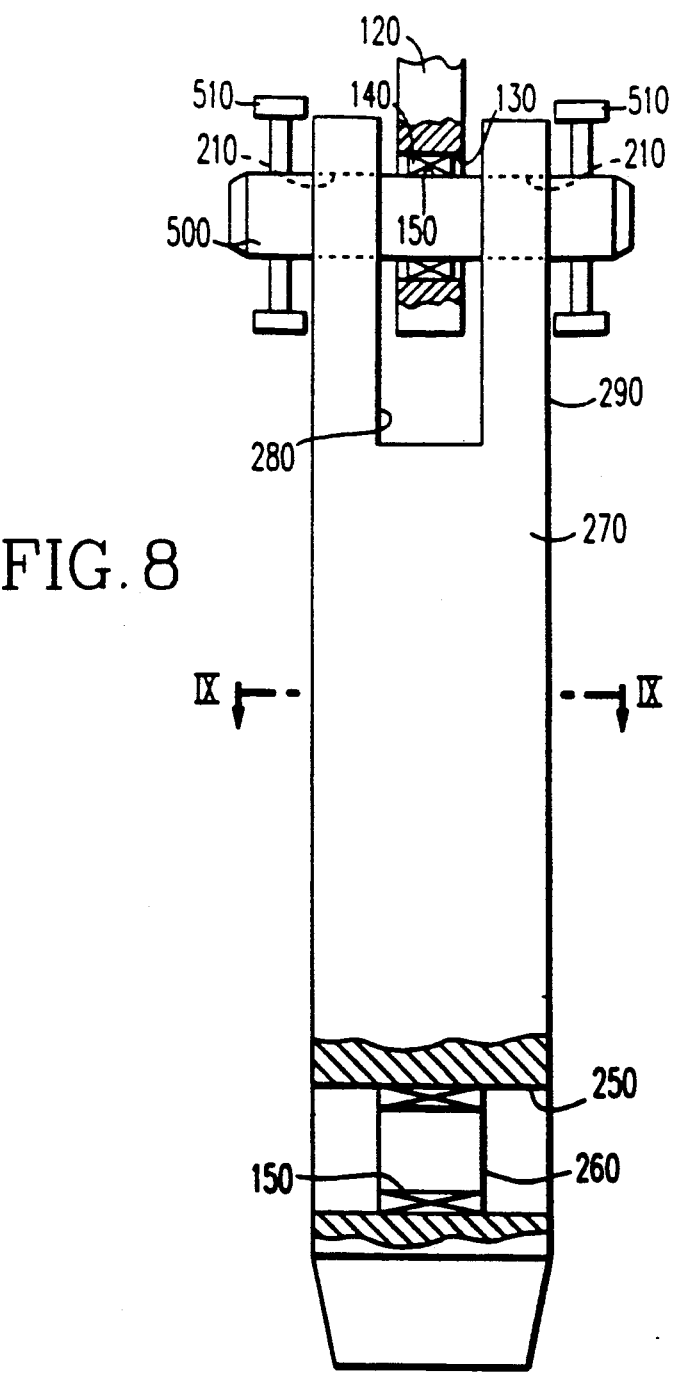
FIG. 8 is a view in partial vertical section of an alternative embodiment of the support column.
Figure 9:
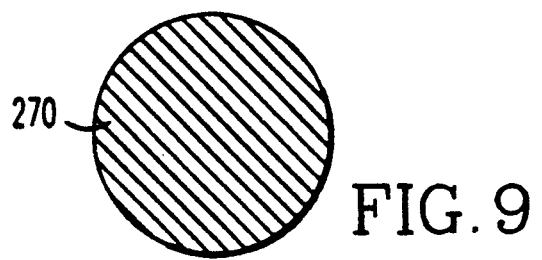
FIG. 9 is a view in horizontal section of the alternative embodiment of the support column taken along section line IX—IX of FIG. 8.

Referring to FIGS. 8 and 9, there is shown an alternative embodiment of support column 160, referred to in FIGS. 8 and 9 as support column 270. Support column 270 is generally cylindrical in transverse cross section and has a groove 280 transversely through a distal end portion 290 thereof for receiving bracket 120. In this alternative embodiment of the invention, support column 270 is generally cylindrical.

Figure 10:
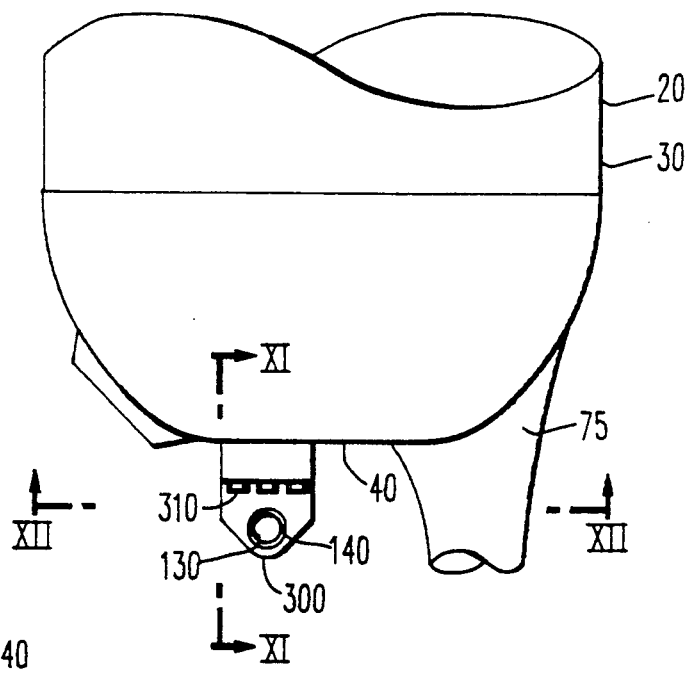
FIG. 10 illustrates an alternative embodiment of the bracket.
Figure 11:
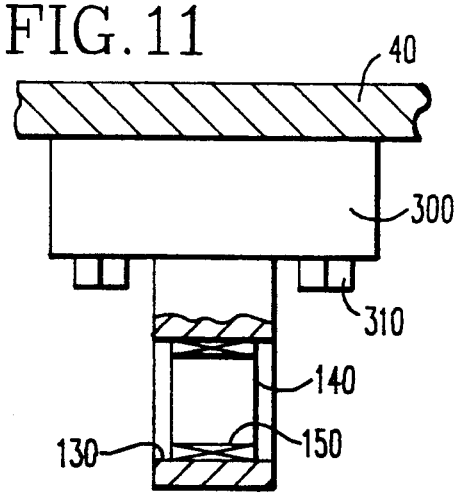
FIG. 11 is a view in partial vertical section of the alternative embodiment of the bracket taken along section line XI—XI of FIG. 10.
Figure 12:
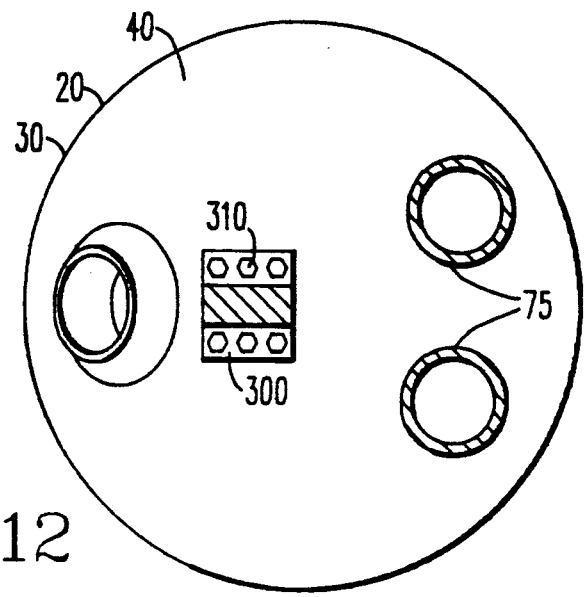
FIG. 12 is a view in partial horizontal section of the alternative embodiment of the bracket taken along section line XII—XII of FIG. 10.

Referring to FIGS. 10, 11, and 12, there is shown an alternative embodiment of bracket 120, referred to in FIGS. 10, 11, and 12 as bracket 300. In this alternative embodiment, bracket 300 is integrally attached to bottom surface 40 by a plurality of screws 310 rather than by weldments. In this alternative embodiment of the invention, bracket 300 is attached to bottom surface 140 by screws 310.

Figure 13:
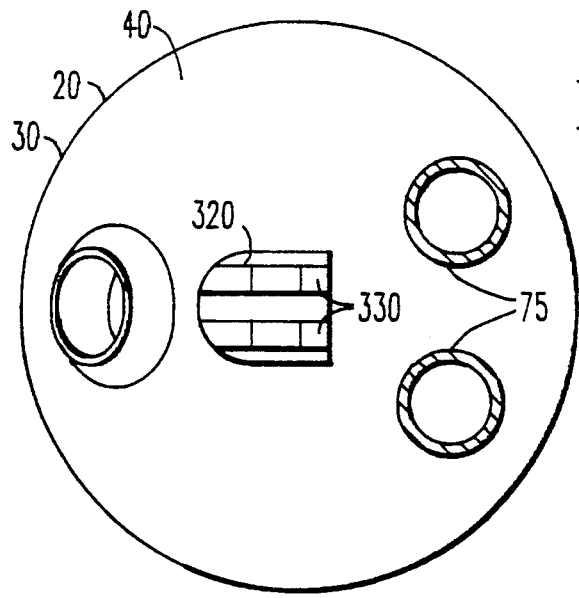
FIG. 13 is a view of a second alternative embodiment of the bracket.
Figure 14:
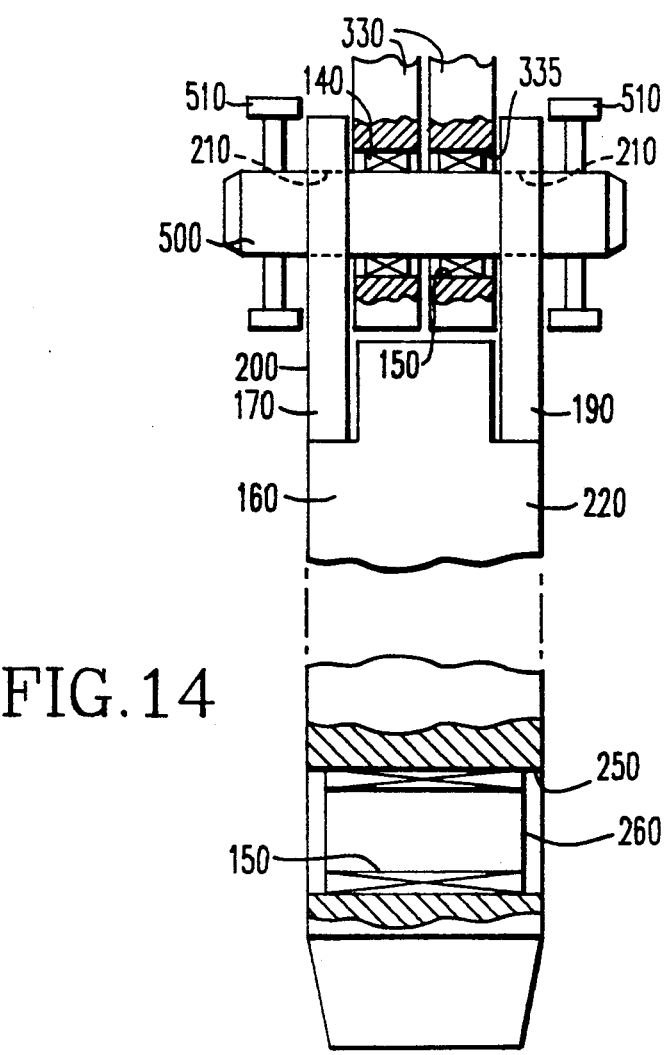
FIG. 14 is another view in partial vertical section of the second alternative embodiment of the bracket having the support column connected thereto.
Figure 15:
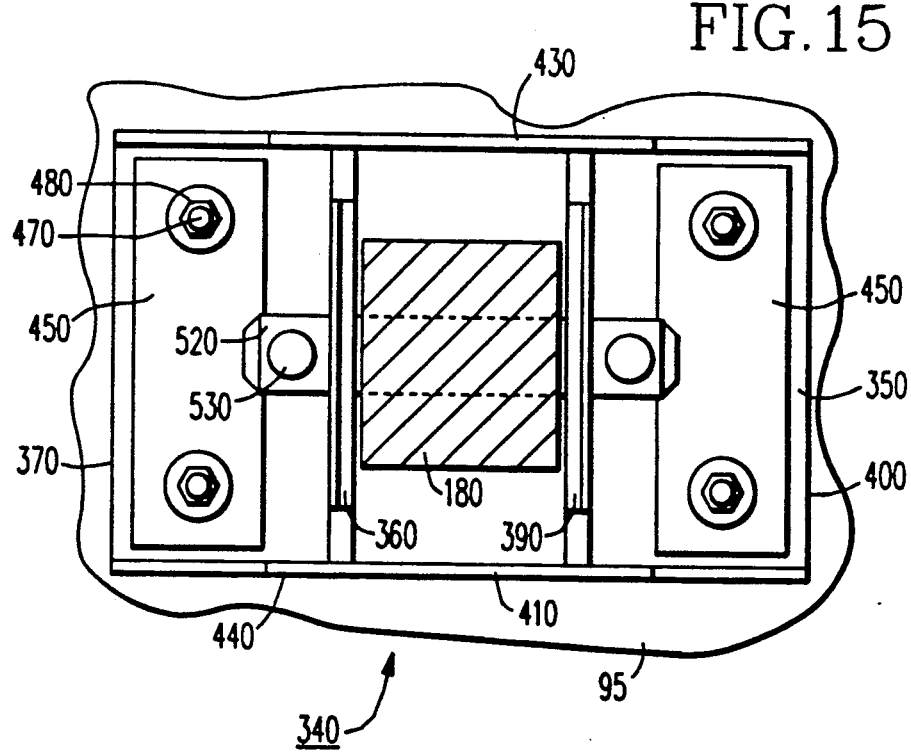
FIG. 15 is a plan view of a base pad assembly.
Figure 16:
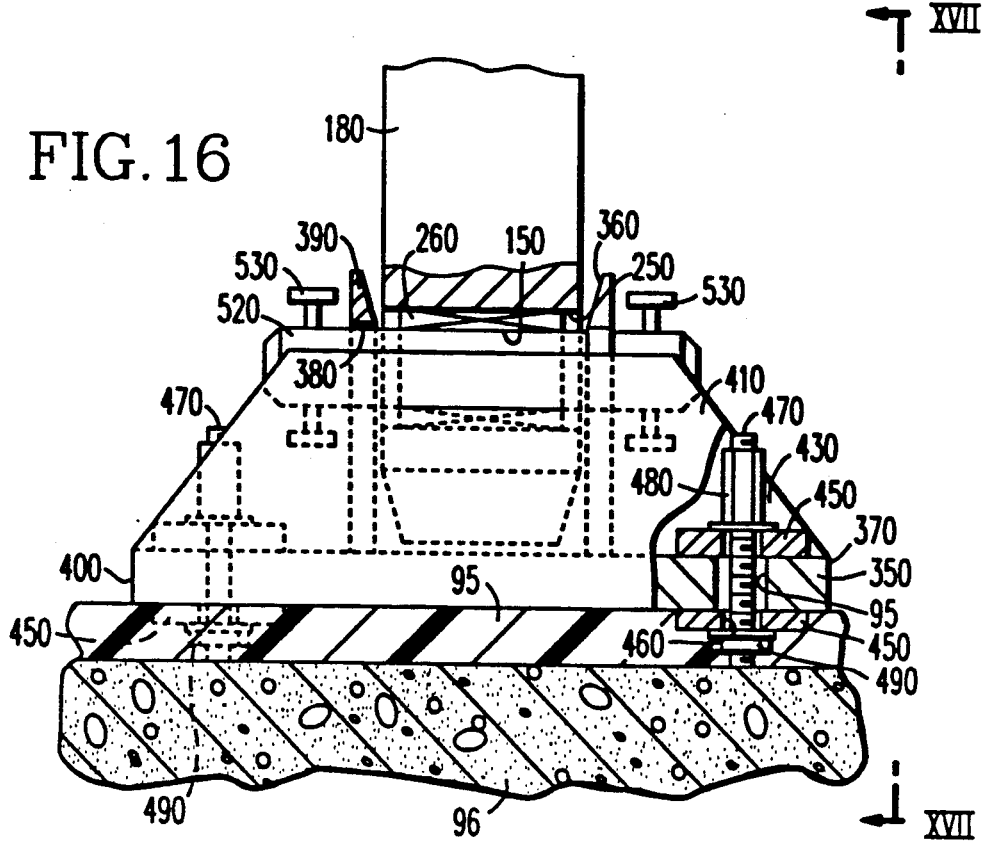
FIG. 16 is a view in partial vertical section of the base pad assembly in a level position and anchored in a floor.
Figure 17:
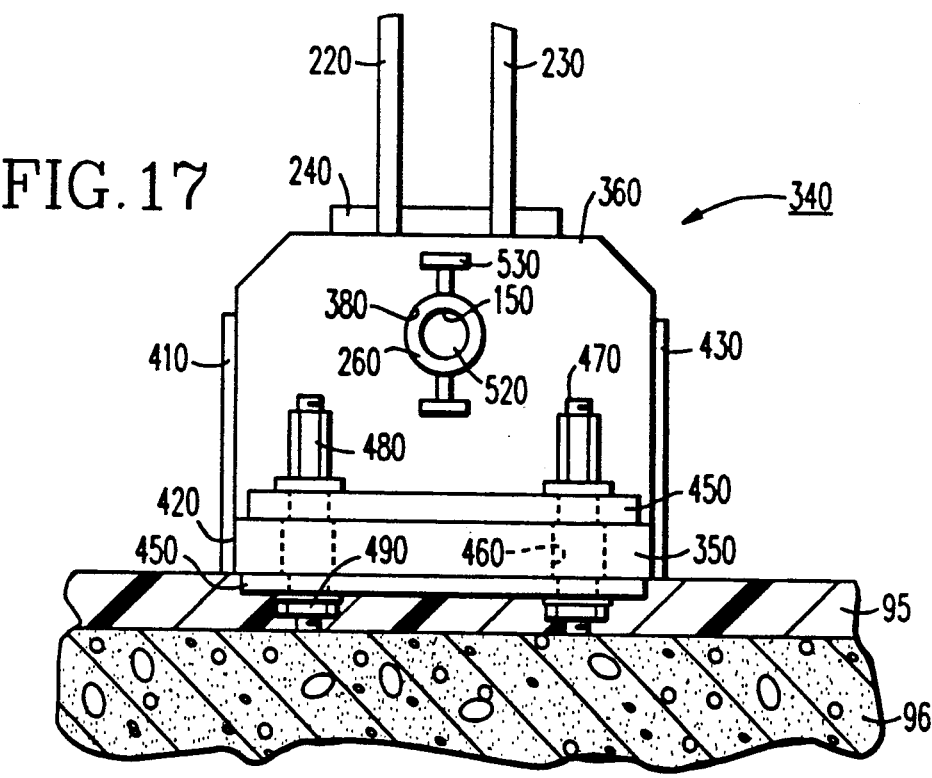
FIG. 17 is another view of the base pad assembly in a level position and anchored in the floor.

Referring to FIGS. 13 and 14, there is shown yet another alternative embodiment of bracket 120, referred to in FIGS. 13 and 14 as bracket 320. In this alternative embodiment, bracket 320 is attached (such as by welding) to and depends from bottom surface 40 and includes a plurality of tines 330 each having a hole 335 transversely therethrough. Matingly disposed in each hole 340 is first bearing 140. In this alternative embodiment of the invention, bracket 320 has tines.

As seen in FIGS. 2, 15, 16 and 17 a base pad assembly, generally referred to as 340 and which belongs to vertical support means 90 is pivotally connected to proximal end portion 180 of support column 160 for vertically pivotally supporting support column 160 and steam generator 20. Base pad assembly 340 comprises a generally rectangular base plate 350 capable of resting on floor 95. A first front plate 360, which is spaced inwardly from a marginal edge 370 of base plate 350, is integrally attached to base plate 350 and upwardly extends therefrom. First front plate 360 has a circular hole 380 transversely therethrough co-linearly alignable with passage 150 formed in second bearing 260. A second front plate 390, which is spaced inwardly from a marginal edge 400 of base plate 350, is integrally attached to base plate 350 and upwardly extends therefrom. Second front plate 390, which is spaced-apart from first front plate 360, also has the circular hole 380 transversely therethrough which is co-linearly alignable with passage 150 formed in second bearing 260. First front plate 360 and second front plate 390 are each outwardly canted on the inboard side thereof and at the distal end portion thereof for easily slidably receiving tapered proximal end portion 180 of support column 160. Base pad assembly 340 further comprises a first side plate 410 integrally attached to base plate 350 and upwardly extending therefrom. First side plate 410, which is disposed perpendicularly to first front plate 360 and second front plate 390, extends along a marginal edge 420 of base plate 350. A second side plate 430 is integrally attached to base plate 350 and upwardly extends therefrom Second side plate 430, which is disposed parallel to first side plate 410, extends along a marginal edge 440 of base plate 350.

Still referring to FIGS. 2, 15, 16 and 17, a plurality of blocks 450 are connected to base plate 350 for reasons disclosed presently. In the preferred embodiment, four blocks 450 are provided. Two of the blocks 450 of the preferred embodiment are disposed on the top surface of base slate 350, one on the outboard side of first front plate 360 and the other on the outboard side of second front plate 390. In the preferred embodiment, the two remaining blocks 450 are each disposed on the underside of base plate 350 and are each co-linearly aligned with its corresponding block 450 disposed on the top surface of base plate 350. Formed through each block 450 and through base plate 350 is a bore 460 for receiving a threaded anchor-bolt leveler 470 therethrough. Each anchor-bolt leveler 470 has a distal end portion and a proximal end portion, which proximal end portion is embedded in floor 95. Threadably engaging the distal end portion of each anchor-bolt leveler 470 is a threaded fastener nut 480 capable of being run-down anchor-bolt leveler 470 for anchoring base pad assembly 340 to floor 95. Moreover, threadably engaging the proximal end portion of each anchor-bolt leveler 470 may be a leveler nut 490 for adjusting base pad assembly 340 so that it is level (i.e., perpendicular to the normal vertical axis of steam generator 20) with respect to floor 95. In the preferred embodiment, the proximal end of each anchor-bolt leveler 470 abuts foundation 96. Thus, each leveler nut 490 may be selectively turned so that it is run-up or run-down anchor-bolt leveler 470 to raise and lower base plate 350 for adjusting base pad assembly 340 so that it is level. Thus, it will be appreciated that anchor-bolt levelers 470, associated fastener nuts 480 and leveler nuts 490 are capable of anchoring base pad assembly 340 in floor 95 and are also capable of leveling base pad assembly 340 with respect to floor 95.

Returning to FIGS. 2, 3, 5, and 7, a generally cylindrical first pivot pin 500 extends through first bore 210 of support column 160, through passage 150 of first bearing 140 and through hole 130 of bracket 120 for pivotally connecting distal end portion 170 of support column 160 to bracket 120. Extending transversely through one end of first pivot pin 500 and connected thereto may be an elongated generally cylindrical rod-like first fastener 510. Moreover, extending transversely through the other end of first pivot pin 500 and connected thereto may be another rod-like first fastener 510. First fasteners 510 assist in maintaining first pivot pin 500 substantially in-place (i.e., substantially stationary) so that first pivot pin 500 will not laterally translate through first bore 210, through passage 150 and through hole 130. In this manner, support column 160 will remain pivotally connected to bracket 120. Moreover, a generally cylindrical second pivot pin 520 extends through second bore 250 of support column 160, through passage 150 of second bearing 260 and through hole 380 of first front plate 360 and second front plate 390 for pivotally connecting proximal end portion 180 of support column 160 to base pad assembly 340. Extending transversely through one end of second pivot pin 520 and connected thereto is an elongated generally cylindrical rod-like second fastener 530. Moreover, extending transversely through the other end of second pivot pin 520 and connected thereto is another second fastener 530. Second fasteners 530 assist in maintaining second pivot pin 520 substantially in-place (i.e., substantially stationary) so that second pivot pin 520 will not laterally translate through second bore 250, through passage 150 and through hole 380. In this manner, support column 160 will remain pivotally connected to base pad assembly 190.

Returning now to FIGS. 1 and 18, there is shown upper support means 100 comprising an elongated male key member 540 connected by attachment member 545 to side surface 70 of steam generator 20, which attachment member 545 is itself integrally attached to side surface 70. Male key 540 extends outwardly from side surface 70 for engaging a recessed keyway 550 formed in a complementary female stop member 560 attached to an adjacent wall 570. Of course, female stop member 560 is disposed adjacent male key 540. In the preferred embodiment of the invention, there are two sets each comprising one female stop member 560, one male key 540 and one associated attachment member 545. In the preferred embodiment of the invention, one set (i.e., one female stop member, one male key 540 and one attachment member 545) is disposed on an axis 180 degrees with respect to the other set. It will be appreciated that as upper portion 60 of steam generator 20 laterally moves in either direction along this axis, male key 540 will engage recessed keyway 550 and abut the rear portion of stop member 560 so that steam generator 20 is laterally supported thereby. Moreover, it will be appreciated that each recessed keyway 550 functions as a guide to abate or mitigate any to-and-fro rocking motion of steam generator 20 (i.e., rocking motion not along the axis referred to immediately hereinabove).

Referring again to FIGS. 1 and 18, there is illustrated limit means 110 for limiting the lateral movement of steam generator 20. Limit means 110 includes a snubber assembly 580 connected to attachment member 545 at one end thereof and attached to adjacent wall 570 at the other end thereof. In the preferred embodiment of the invention, there are two snubber assemblies 580. In the preferred embodiment of the invention, the two snubber assemblies 580 are arranged in spaced-apart parallel trains. Moreover, each of the two trains is disposed 90 degrees with respect to the axis extending through male key 540 and its associated female stop member 560. Snubber assemblies 580 dampen or limit the lateral movement of steam generator 20 as steam generator 20 laterally moves in a direction perpendicular to the axis extending through male key 540 and female stop member 560. Thus, it will be appreciated that snubber assemblies 580 function as shock suppressors for abating or mitigating movement of steam generator 20 along an axis parallel to the axes of the snubber trains.

Referring to FIGS. 1 and 19, there is shown lower support means 590 comprising a restraining member or "flat" 600 integrally attached to side surface 70 of intermediate portion 50 which belongs to steam generator 20. Flat 600 extends outwardly from side surface 70 for abutting a bumper 610 attached to adjacent wall 570. Of course, bumper 610 is disposed adjacent flat 600. In the preferred embodiment of the invention, there are two sets each comprising one flat 600 and one bumper 610. In the preferred embodiment of the invention, one set (i.e., one flat 600 and one bumper 610) is disposed on an axis 180 degrees with respect to the other set. It will be appreciated that as intermediate portion 50 of steam generator 20 laterally moves in either direction along this axis, flat 600 will abut against and engage bumper 610 so that steam generator 20 is laterally supported thereby.

OPERATION

During operation, structural support system 80 will provide vertical and lateral support for steam generator 20 and will also dampen or limit the lateral movement of steam generator 20.

As described hereinabove, base pad assembly 340 is adjustable for allowing base pad 340 to be disposed level (i.e., perpendicular to the normal vertical axis of steam generator 20) with respect to floor 95. In this regard, base pad 340 may be disposed on a foundation 96 such that the proximal ends of anchor-bolt levelers 470 rest on the top surface of foundation 96. If necessary, leveler nuts 490 are rotated or threadably run-up anchor-bolt levelers 470 by a suitable wrench (not shown) such that base plate 350 is level. It will be appreciated that when base plate 350 is level, base pad assembly 340 is also level. As base pad assembly 340 rests on foundation 96, a distance will be defined between foundation 96 and base plate 350. This distance between foundation 96 and base plate 350 may be filled by a suitable grout or the like to form floor 95 such that base pad assembly 340 is imbedded in floor 95 and is level therewith. Fastener nuts 480 are threadably run-down anchor-bolt levelers 470 for fastening or tightening base pad assembly 340 to floor 95. In this manner, base pad assembly 340 will be anchored in and tightened against floor 95 such that it will not substantially move when subjected to vertical and/or lateral loads.

After base pad assembly 340 is suitably level and anchored to floor 95, support column 160 may be pivotally connected thereto. In this regard, proximal end portion 180 of support column 160 is slidably interposed between first front plate 360 and second front plate 390. The outwardly canted distal end portions of first front plate 360 and second front plate 390 allow tapered proximal end portion 180 to be easily slidably interposed or inserted between first front plate 360 and second front plate 390. Second pivot pin 520 is disposed through holes 380 formed in first front plate 360 and second front plate 390, through passage 150 of second bearing 520, and through second bore 250 of support column 160 for connecting support column 160 to base pad assembly 340. Second pivot pin 520 and second bearing 520 allow support column 160 to smoothly slidably pivot on second bearing 520 about a longitudinal axis extending through second pivot pin 520. Thus, support column 160 is capable of pivoting in an arc perpendicular to the longitudinal axis of second pivot pin 520. Second fasteners 530, which are transversely extended through the ends of second pivot pin 520, ensure that second pivot pin 520 will not pass through proximal end portion 180 of support column 160. In this manner, proximal end portion 180 of support column 160 will remain pivotally connected to base pad assembly 340.

Distal end portion 170 of support member 160 is pivotally connected to steam generator 20. In this regard, distal end portion 170 is positioned such that first plate member 190 and second plate member 200 belonging to support column 160 are disposed on opposite sides of bracket 120. That is, first bore 210 formed in distal end portion 170 is co-linearly aligned with passage 150 formed in first bearing 140. First pivot pin 500 is then disposed through first bores 210 of distal end portion 170, through passage 150 in first bearing 140, and through hole 130 of bracket 120 for pivotably connecting support column 160 to steam generator 20. First pivot pin 500 and first bearing 140 allow support column 160 to smoothly slidably pivot on first bearing 140 about a longitudinal axis extending through first pivot pin 500. Thus, support column 160 is capable of pivoting in an arc perpendicular to the longitudinal axis of first pivot pin 10 500.

As disclosed hereinabove, upper support means 100 is connected to steam generator 20 for laterally supporting steam generator 20. In this regard, male key 540 will engage keyway 550 belonging to female stop member 560 as steam generator 20 moves laterally. Eventually, male key 540 will abut the rear portion of keyway 550 of female stop member 560 for stopping the lateral movement of steam generator. Moreover, each recessed keyway 550 will function as a guide to abate or mitigate any to-and-fro motion of steam generator 20.

As disclosed hereinabove, lower support means 590 is connected to steam generator 20 for further laterally supporting steam generator 20. In this regard, flat 600 will abut against and engage bumper 610 as steam generator 20 moves laterally.

Moreover, disclosed hereinabove, limit means 110 is connected to steam generator 10 for dampening or limiting lateral movement of steam generator 10. In this regard, snubber assemblies 580 are disposed such that they will dampen or limit the lateral movement of steam generator 10.

It should be apparent from the teachings disclosed herein that the single support column 160 of the present invention allows for savings in material and fabrication costs when compared to prior art multiple support column configurations. That is, fewer support columns, anchoring pads, spherical bearings, and floor attachment bolts are required in the present invention than are required in prior art support devices.

In addition, when compared to prior art support devices, single support column 160 of the present invention improves access to structures located in the space adjacent lower portion 30 of steam generator 10. For example, the single column design provides improved access for manway cover (not shown) removal and installation, inspection of the channel head to tubesheet weld (not shown), and inspection of pumps 75. Improved access necessarily reduces the time required to perform inspection and maintenance, thereby also resulting in reduced accumulated radiation dose to inspection and maintenance personnel.

Moreover, it is known that primary loop piping 77 will typically undergo thermal expansion as the temperature of the primary fluid flowing therethrough rises during operation of the nuclear reactor core (not shown). As primary loop piping 77 undergoes thermal expansion, it may move laterally away from the nuclear reactor by approximately 0.5 to 1.5 inches depending on the primary loop configuration. As primary loop piping 77 laterally moves, steam generator 20 will laterally move to a like extent. Moreover, steam generator 20 may be subject to what is termed in the art as upset events (e.g., postulated accidents and earthquake seismic loading) which may cause steam generator 20 to vertically and laterally move and to experience to-and-fro rocking motion. It will be appreciated that, in case of either primary loop piping thermal expansion or upset events, structural system 80 will vertically and laterally support steam generator 20, so that steam generator 20 is not substantially damaged during the upset event.

In addition, overturning moments, which are induced by seismic loading in prior art steam generator 20 support devices, will not occur when the present invention is used to support steam generator 20. This is so because steam generator 20 is pivotally connected to support column 160 by first pivot pin 500, which support column 160 in turn is pivotally connected to base pad assembly 340, second pivot pin 520. That is, movement of steam generator 20 during seismic loading will cause distal end portion 170 of support column 160 to pivot about first pivot pin 500 as proximal end portion 180 of support column 160 pivots about second pivot pin 520. The direction of pivoting movement of proximal end portion 180 will be opposite the direction of pivoting movement of distal end portion 170. Therefore, support column 160 will bear substantially all vertical loads acting thereon (e.g., the weight of steam generator 20, loadings due to postulated accidents, as well as seismic loads) and will not overturn.

While the invention has been described in connection with specific embodiments thereof, it will be understood that it is capable of further modifications. The claims are intended to cover any variations, uses or adaptations of the invention following, in general, the principles of the invention, and including such departures from the present disclosure as come within known and customary practice within the art to which the invention pertains. For example, although the disclosure of the invention is made with reference to a nuclear steam generator, the invention is capable of being used with any similar structure requiring vertical and lateral supports. As another modification, the support column 270 (see FIGS. 8 and 9) may be rectangular rather than cylindrical and may have a square or rectangular transverse cross-section rather than the cylindrical cross-sectional configuration disclosed hereinabove.

Therefore, what is provided is a lateral and vertical support system for a vessel such as, for example, a nuclear steam generator.

What is claimed is:

1. A system for supporting a heat exchanger vessel having a bottom surface and a side surface, comprising:
   (a) means connected to the bottom surface for vertically supporting the vessel, said vertical support means including:
     (i) a bracket attached to the bottom surface of the vessel; and
     (ii) a vertical support member pivotally connected to said bracket;
   (b) upper support means connected to and disposed adjacent to the side surface for laterally supporting the vessel; and
   (c) means attached to the side surface for dampening lateral movement of the vessel.

2. The system according to claim 1, wherein said vertical support means further comprises a base pad assembly connected pivotally to said vertical support member.

3. The system according to claim 2, wherein said vertical support means further comprises:
   (a) a first pivot pin extending through said vertical support member and through said bracket; and
   (b) a second pivot pin extending through said vertical support member and through said base pad assembly.

4. The system according to claim 1, wherein said upper support means comprises:

(a) a key attached to the side surface of said vessel; and (b) a stop member disposed adjacent said key, said stop member having a keyway therein for receiving said key.

5. The system according to claim 1, wherein said dampening means comprises a snubber connected to the side surface.

6. The system according to claim 1, further comprising lower support means connected to and disposed adjacent to the side surface for laterally supporting the vessel.

7. The system according to claim 6, wherein said lower support means comprises:

(a) a restraining member attached to the side surface of said vessel; and (b) a bumper disposed adjacent said restraining member.

8. A system for supporting a heat exchanger having an exterior bottom surface and an exterior side surface, comprising:

(a) a bracket attached to the bottom surface of the heat exchanger, said bracket having a hole transversely therethrough;

(b) a support column pivotally connected to said bracket for vertically supporting the heat exchanger, said support column having a distal end portion having a first bore transversely therethrough coaxially aligned to the hole in said bracket, said support column having a proximal end portion having a second bore transversely therethrough; and (c) a first bearing disposed in the hole in said bracket and a second bearing disposed in the second bore of said support column, said first bearing and said second bearing having a passage therethrough.

9. The system according to claim 8, further comprising a base pad assembly connected pivotally to the proximal end portion of said support column, said base pad assembly having a hole therethrough coaxially aligned to the second bore of said support column.

10. The system according to claim 9, further comprising:

(a) a first pivot pin extending through the first bore in said support column, through the passage in said first bearing, and through the hole in said bracket for pivotally connecting the distal end portion of said support column to said bracket;

(b) a second pivot pin extending through the second bore in said support column, through the passage in said second bearing, and through the hole in said base pad assembly for pivotally connecting the proximal end portion of said support column to said base pad assembly.

11. The system according to claim 10, further comprising:

(a) a male key member attached to the vertical side surface of said steam generator and extending outwardly therefrom; and (b) a female stop member disposed adjacent said male key member for laterally supporting the heat exchanger, said female stop member having a keyway therein for receiving said male key.

12. The system according to claim 11, further comprising a snubber connected to the vertical side surface for dampening lateral movement of said heat exchanger.

13. The system according to claim 10, further comprising:

(a) an elongated restraining member integrally attached to the side surface of said heat exchanger; and (b) a bumper disposed adjacent said restraining member.

14. A system for vertically and laterally supporting a nuclear steam generator having a lower portion having a horizontal exterior bottom surface and having a vertical exterior side surface, comprising:

(a) a bracket attached to and depending from the bottom surface of the steam generator, said bracket having a circular hole transversely therethrough;

(b) a vertical support column pivotally connected to said bracket for vertically supporting the steam generator, said support column having a distal end portion having a first circular bore transversely therethrough coaxially aligned to the hole in said bracket, said support column having a proximal end portion having a second circular bore transversely therethrough; and (c) a spherical first bearing matingly disposed in the hole in said bracket and a spherical second bearing matingly disposed in the second bore of said support column, said first bearing and said second bearing having a passage therethrough.

15. The system according to claim 14, wherein said support column comprises:

(a) a first plate member having a transverse bore therethrough;

(b) a second plate member spaced-apart from and disposed parallel to said first plate member, said second plate member having a transverse bore therethrough coaxially aligned to the bore in said first plate member, said first plate member and said second plate member defining the distal end portion of said support column;

(c) a third plate member attached to and disposed perpendicular to said first plate member and said second plate member;

(d) a fourth plate member attached to and disposed perpendicular to said first plate member and said second plate member, said fourth plate member disposed parallel to said third plate member; and (e) a fifth plate member attached to and disposed perpendicular to said third plate member and said fourth plate member, said fifth plate member having a transverse bore therethrough, the bore having the spherical second bearing matingly disposed therein, said fifth plate member having a tapered end portion, said fifth plate member defining the proximal end portion of said support column.

16. The system according to claim 14, wherein said support column comprises an elongated generally cylindrical body having a groove transversely through a distal end portion thereof, the groove defining tines in the distal end portion, each of the tines having a transverse bore therethrough, said body having a tapered end portion defining a proximal end portion of said body, said tapered end portion having a bore transversely therethrough, the bore having the spherical second bearing matingly disposed therein.

17. The system according to claim 14, further comprising a base pad assembly pivotally connected to the proximal end portion of said support column, said base pad assembly having a hole therethrough coaxially aligned to the second bore in said support column.

18. The system according to claim 17, wherein said base pad assembly comprises:

(a) a base plate having a plurality of marginal edges;
(b) a first front plate integrally attached to said base plate and upwardly extending therefrom, said first front plate spaced inwardly from a marginal edge of said base plate, said first front plate having a hole therethrough coaxially aligned to the passage of the second bearing;
(c) a second front plate integrally attached to said base plate and spaced-apart from said first front plate, said second front plate spaced inwardly from a marginal edge of said base plate, said second front plate upwardly extending from said base plate parallel to said first front plate, said second front plate having a hole therethrough coaxially aligned to the passage of the second bearing;
(d) a first side plate integrally attached to said base plate and upwardly extending therefrom, said first side plate disposed perpendicularly to said first front plate and said second front plate, said first side plate extending along a marginal edge of said base plate;
(e) a second side plate integrally attached to said base plate and spaced-apart from said first side plate, said second side plate upwardly extending from said base plate parallel to said first side plate, said second side plate extending along a marginal edge of said base plate; and
(f) a plurality of anchor-bolt levelers connected to said base plate for anchoring said base pad assembly to a floor and for adjusting said base pad assembly level with respect to the floor.

19. The system according to claim 18, further comprising:
(a) a generally cylindrical first pivot pin extending through the first bore of said support column, through the passage in said first bearing, and through the hole in said bracket for pivotally connecting the distal end portion of said support column to said bracket, said first pivot pin including an elongated first fastener extending transversely through said first pivot pin for maintaining said first pivot pin substantially in place; and
(b) a generally cylindrical second pivot pin extending through the hole in said first front plate, through the second bore of said support column, through the passage in said second bearing, and through the hole in said second front plate for pivotally connecting the proximal end portion of said support column to said base pad assembly, said second pivot pin including an elongated second fastener extending transversely through said second pivot pin for maintaining said second pivot pin substantially in place.

20. The system according to claim 19, further comprising:
(a) an elongated male key member attached to the exterior side surface of said steam generator and extending outwardly therefrom; and
(b) a complementary female stop member disposed adjacent said make key member for laterally supporting the steam generator, said female stop member having a recessed keyway therein for matingly receiving said male key member.

21. The system according to claim 19, further comprising:
(a) an elongated restraining member integrally attached to the side surface of the steam generator and outwardly extending therefrom; and
(b) a bumper disposed adjacent said restraining member.

22. The system according to claim 20, further comprising a snubber connected to the exterior side surface of said steam generator for dampening lateral movement of said steam generator.

* * * * *